United States Patent
Choi et al.

(10) Patent No.: US 7,508,881 B2
(45) Date of Patent: Mar. 24, 2009

(54) CURRENT MODE DIFFERENTIAL TRANSMISSION METHOD AND SYSTEM FOR TRANSMITTING THREE UNITS OF DATA USING FOUR SIGNAL LINES

(75) Inventors: Seok Woo Choi, Pohang (KR); Hong June Park, Pohang (KR)

(73) Assignee: Postech Academy-Industrial Foundation, Pohang-city (KR)

( * ) Notice: Subject to any disclaimer, the term of this patent is extended or adjusted under 35 U.S.C. 154(b) by 705 days.

(21) Appl. No.: 11/142,361

(22) Filed: Jun. 2, 2005

(65) Prior Publication Data

US 2006/0013331 A1     Jan. 19, 2006

(30) Foreign Application Priority Data

Jul. 16, 2004   (KR) ................ 10-2004-0055462

(51) Int. Cl.
    *H04L 25/34*    (2006.01)
    *H04B 3/00*     (2006.01)
(52) U.S. Cl. .................. 375/288; 375/257; 327/359
(58) Field of Classification Search ......... 375/257–258, 375/285, 288, 316, 318, 286, 244; 327/52, 327/96, 359; 370/284
See application file for complete search history.

(56) References Cited

U.S. PATENT DOCUMENTS

| | | | | |
|---|---|---|---|---|
| 6,005,895 A | * | 12/1999 | Perino et al. | 375/288 |
| 6,226,330 B1 | * | 5/2001 | Mansur | 375/257 |
| 6,359,931 B1 | * | 3/2002 | Perino et al. | 375/257 |
| 6,556,628 B1 | | 4/2003 | Poulton et al. | |
| 6,944,239 B2 | * | 9/2005 | Cecchi et al. | 375/316 |
| 7,142,612 B2 | * | 11/2006 | Horowitz et al. | 375/286 |

OTHER PUBLICATIONS

Korean Office Action to corresponding application KR10-2004-0055462.

* cited by examiner

*Primary Examiner*—Khanh C Tran
(74) *Attorney, Agent, or Firm*—Rothwell, Figg, Ernst & Manbeck

(57) ABSTRACT

Provided are a current mode differential transmission method and system for differentially transmitting three units of data using four signal lines. The method includes: dividing the four signal lines $1a$, $1b$, $2a$ and $2b$ into two pairs of signal lines $1a/1b$ and $2a/2b$, and differentially transmitting respective data (first data and second data) via the two pairs of signal lines $1a/1b$ and $2a/2b$; and transmitting the other data (third data) by differentially changing common mode currents of the two pairs of signal lines $1a/1b$ and $2a/2b$.

10 Claims, 9 Drawing Sheets

WHEN THIRD DATA IS 0

WHEN THIRD DATA IS 1

FIG. 3A

| Data 1 | I(1a) | I(1b) |
|---|---|---|
| 0 | 0 | I |
| 1 | I | 0 |

| Data 2 | I(2a) | I(2b) |
|---|---|---|
| 0 | −I | 0 |
| 1 | 0 | −I |

WHEN Data3 IS 1

FIG. 3B

| Data 1 | I(1a) | I(1b) |
|---|---|---|
| 0 | −I | 0 |
| 1 | 0 | −I |

| Data 2 | I(2a) | I(2b) |
|---|---|---|
| 0 | 0 | I |
| 1 | I | 0 |

WHEN Data3 IS 0

CURRENT MODE DIFFERENTIAL TRANSMISSION METHOD AND SYSTEM FOR TRANSMITTING THREE UNITS OF DATA USING FOUR SIGNAL LINES

BACKGROUND OF THE INVENTION

This application claims the priority of Korean Patent Application No. 10-2004-0055462, filed on Jul. 16, 2004, in the Korean Intellectual Property Office, the disclosure of which is incorporated herein in its entirety by reference.

1. Field of the Invention

The present invention relates to a current mode differential transmission method and system for differentially transmitting three units of data using four signal lines.

2. Description of the Related Art

As well-known to those in the art, a signal transmission system is divided into a single ended transmission system and a differential transmission system. The single ended transmission system transmits a signal using one signal line and a common ground line. In the single ended transmission system, a base power source (for example, 0 voltage) is conducted to the common ground line, and a voltage, i.e., a potential difference, between the one signal line and the common ground line varies according to a data value to be transmitted. When the single ended transmission system transmits a digital signal, a reference voltage is necessary to determine whether a signal received in a receiver is 0 or 1. That is, the signal is determined as 1 when a received signal voltage is larger than the reference voltage and 0 when the received signal voltage is smaller than the reference voltage.

A single ended transmission method using the reference voltage has two problems when transmitting data at a high data rate. First, noise is mixed in the reference voltage, and a noise margin is reduced. Accordingly, errors are frequently generated when restoring the data. Second, a waveform of a transmitted signal is distorted due to switching noise such as ground bounce due to the high data rate transmission. Since this common mode noise cannot be removed in a receiver, errors are frequently generated when restoring the data.

Therefore, in order to transmit data at a high data rate, a differential transmission method is typically used. In the differential transmission method, a common ground line, a data line, and a complementary data line are used. That is, when data is transmitted, a signal corresponding to the data and a signal complemented to the data are transmitted via respective signal lines. In a receiver, 0 or 1 is determined according to which signal line of the two signal lines has a larger voltage value. Therefore, in the differential transmission method, since voltages of the two signal lines are used as reference voltages to each other, an additional reference voltage is not necessary. Also, since a differential mode voltage of the two signal lines is used in the receiver, the common mode noise generated due to the high data rate transmission is reduced. Accordingly, a signal transmission rate can be largely increased in the differential transmission method compared with the single ended transmission method. Besides the two advantages in the receiver using the differential transmission method, since a constant current flows on a ground pin of a chip in a transmitter driving circuit using the differential transmission method regardless of a data value to be transmitted, the switching noise is reduced. With these advantage described above, the differential transmission method is extensively used for the high data rate transmission. However, since two chip pins and two signal lines are required for transmitting one unit of data, if the number of units of data to be transmitted in a parallel way increase, the number of signal lines and the number of chip pins increase dramatically. Accordingly, a unit price of chip increases, and distribution of signal lines is complicated.

SUMMARY OF THE INVENTION

The present invention provides a current mode differential transmission method for differentially transmitting three units of data using four signal lines, which can be applied to a high speed signal transmission system reducing the number of signal lines and the number of chip pins compared with a conventional differential transmission method and having advantages of the conventional differential transmission method in which common mode noise is removed and a reference voltage is not necessary.

The present invention also provides a current mode differential transmission system for differentially transmitting three units of data using four signal lines, which can be applied to a high speed signal transmission system reducing the number of signal lines and the number of chip pins compared with a conventional differential transmission method and having advantages of the conventional differential transmission method in which common mode noise is removed and a reference voltage is not necessary.

According to an aspect of the present invention, there is provided a current mode differential transmission method for differentially transmitting three units of data using four signal lines, in which predetermined data is differentially transmitted to signal lines, the method comprising: dividing the four signal lines $1a$, $1b$, $2a$ and $2b$ into two pairs of signal lines $1a/1b$ and $2a/2b$, and differentially transmitting respective data (first data and second data) via the two pairs of signal lines $1a/1b$ and $2a/2b$; and transmitting the other data (third data) by differentially changing common mode currents of the two pairs of signal lines $1a/1b$ and $2a/2b$.

Signal changing ranges of the two pairs of signal lines $1a/1b$ and $2a/2b$ may vary according to the third data.

When the third data is 1, the pair of signal lines $1a$ and $1b$ of the first data may have a changing range of 0~I where I is a predetermined amount of current, and the pair of signal lines $2a$ and $2b$ of the second data may have a changing range of −I~0. When the third data is 0, the pair of signal lines $1a$ and $1b$ of the first data may have a changing range of −I~0, and the pair of signal lines $2a$ and $2b$ of the second data may have a changing range of 0~I.

The method may further include: restoring differential data of the first pair of signal lines $1a$ and $1b$ in a first comparator of a receiver and restoring differential data of the second pair of signal lines $2a$ and $2b$ in a second comparator of the receiver; comparing a voltage of the line $1b$ of the first pair of signal lines $1a$ and $1b$ and a voltage of the line $2a$ of the second pair of signal lines $2a$ and $2b$ in a third comparator and comparing the voltage of the line $1b$ of the first pair of signal lines $1a$ and $1b$ and a voltage of the line $2b$ of the second pair of signal lines $2a$ and $2b$ in a fourth comparator; and obtaining restored third data by selecting one of the comparison results of the third comparator and the fourth comparator with reference to the first data and the second data respectively restored by the first comparator and the second comparator.

The method may further include: restoring differential data of the first pair of signal lines $1a$ and $1b$ in a first comparator of a receiver and restoring differential data of the second pair of signal lines $2a$ and $2b$ in a second comparator of the receiver; and discriminating the third data by directly comparing common mode currents of the first pair of signal lines $1a$ and $1b$ and the second pair of signal lines $2a$ and $2b$.

According to another aspect of the present invention, there is provided a current mode differential transmission system for differentially transmitting three units of data using four signal lines, which differentially transmits predetermined data to signal lines, the system comprising: four signal lines 1a, 1b, 2a and 2b divided into two pairs of signal lines 1a/1b and 2a/2b; a transmitter differentially transmitting respective data (first data and second data) via the two pairs of signal lines 1a/1b and 2a/2b and transmitting the other data (third data) by differentially changing common mode currents of the two pairs of signal lines 1a/1b and 2a/2b; and a receiver restoring the first data and the second data using a differential circuit and restoring the third data by discriminating a difference between the common mode currents of the two pairs of signal lines 1a/1b and 2a/2b.

BRIEF DESCRIPTION OF THE DRAWINGS

The above and other features and advantages of the present invention will become more apparent by describing in detail exemplary embodiments thereof with reference to the attached drawings in which:

FIG. 3A illustrates a differential current signal conducted to four signal lines depending on three units of data when third data is '1' according to an embodiment of the present invention;

FIG. 3B illustrates a differential current signal conducted to four signal lines depending on three units of data when third data is '0' according to an embodiment of the present invention;

DETAILED DESCRIPTION OF THE INVENTION

Hereinafter, the present invention will now be described more fully with reference to the accompanying drawings, in which embodiments of the invention are shown. When the present invention is described, if it is determined that a detailed description with respect to related well-known technologies or configurations may unnecessarily make the gist of the present invention ambiguous, the detailed description will be omitted. Terminologies used below are defined considering functions in the present invention, and the terminologies can be changed according to a user, an operator's intention, or custom. Therefore, the definition must be drawn on the basis of contents over this application.

Figure 1:
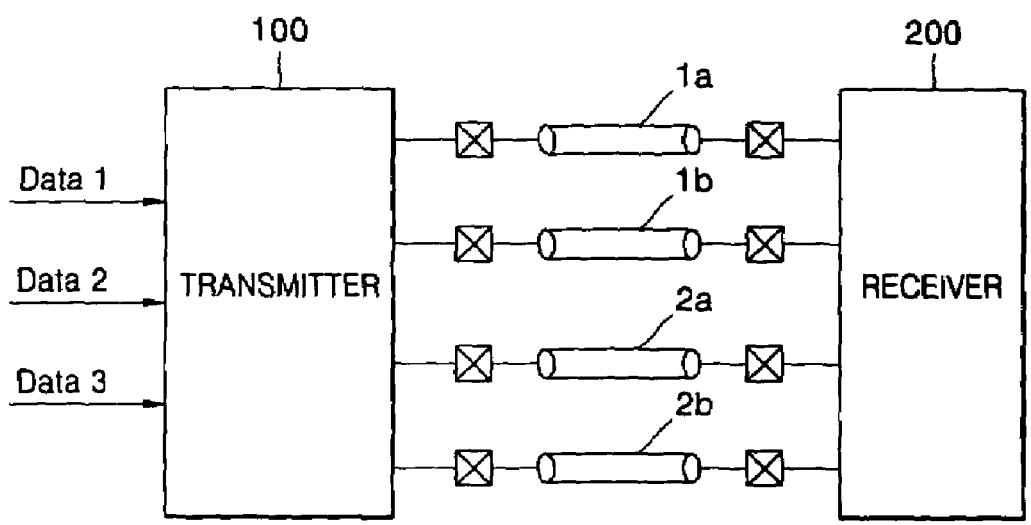
FIG. 1 is a schematic configuration diagram of a current mode differential transmission system for transmitting three units of data using four signal lines according to an embodiment of the present invention.
Figure 2A:
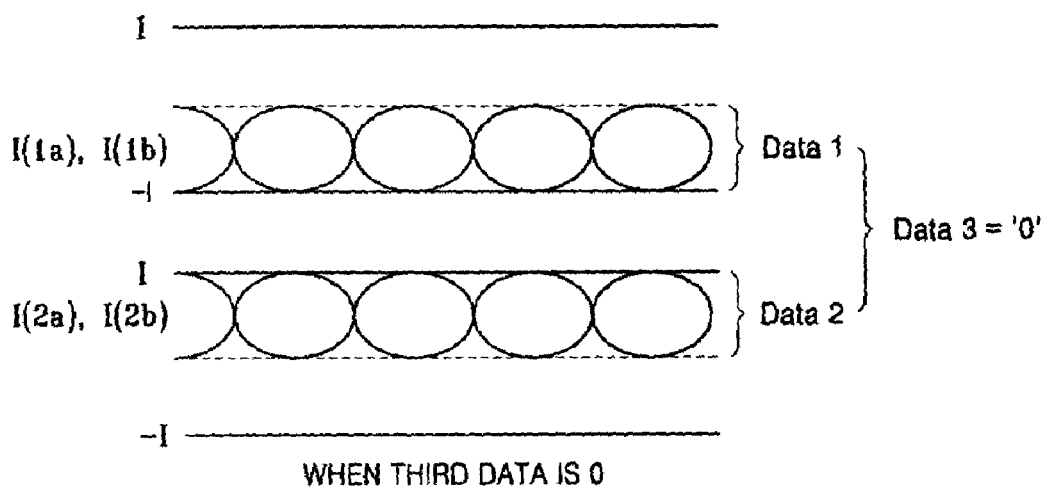
FIG. 2A is a conceptual diagram of a current mode differential transmission method for transmitting three units of data using four signal lines when third data is '0' according to an embodiment of the present invention.
Figure 2B:
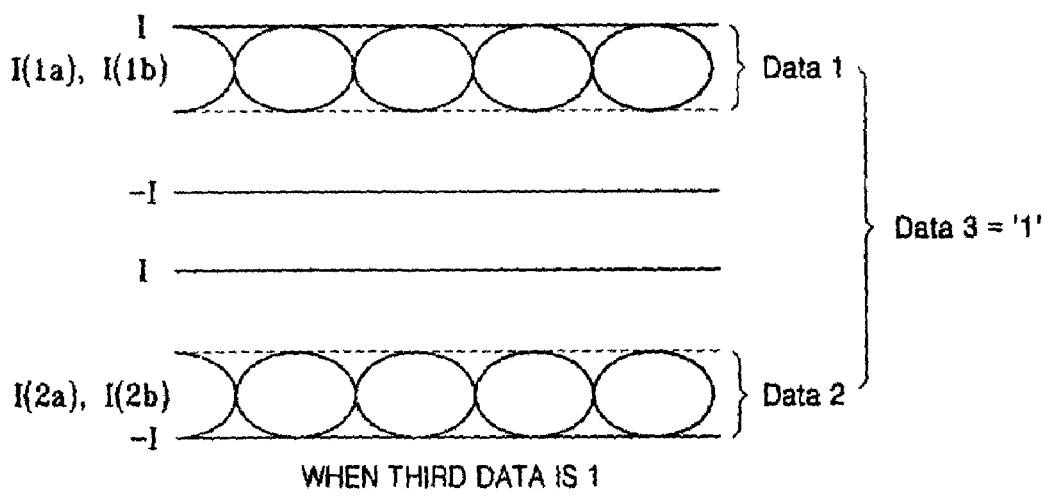
FIG. 2B is a conceptual diagram of a current mode differential transmission method for transmitting three units of data using four signal lines when third data is '1' according to an embodiment of the present invention.
Figure 4A:
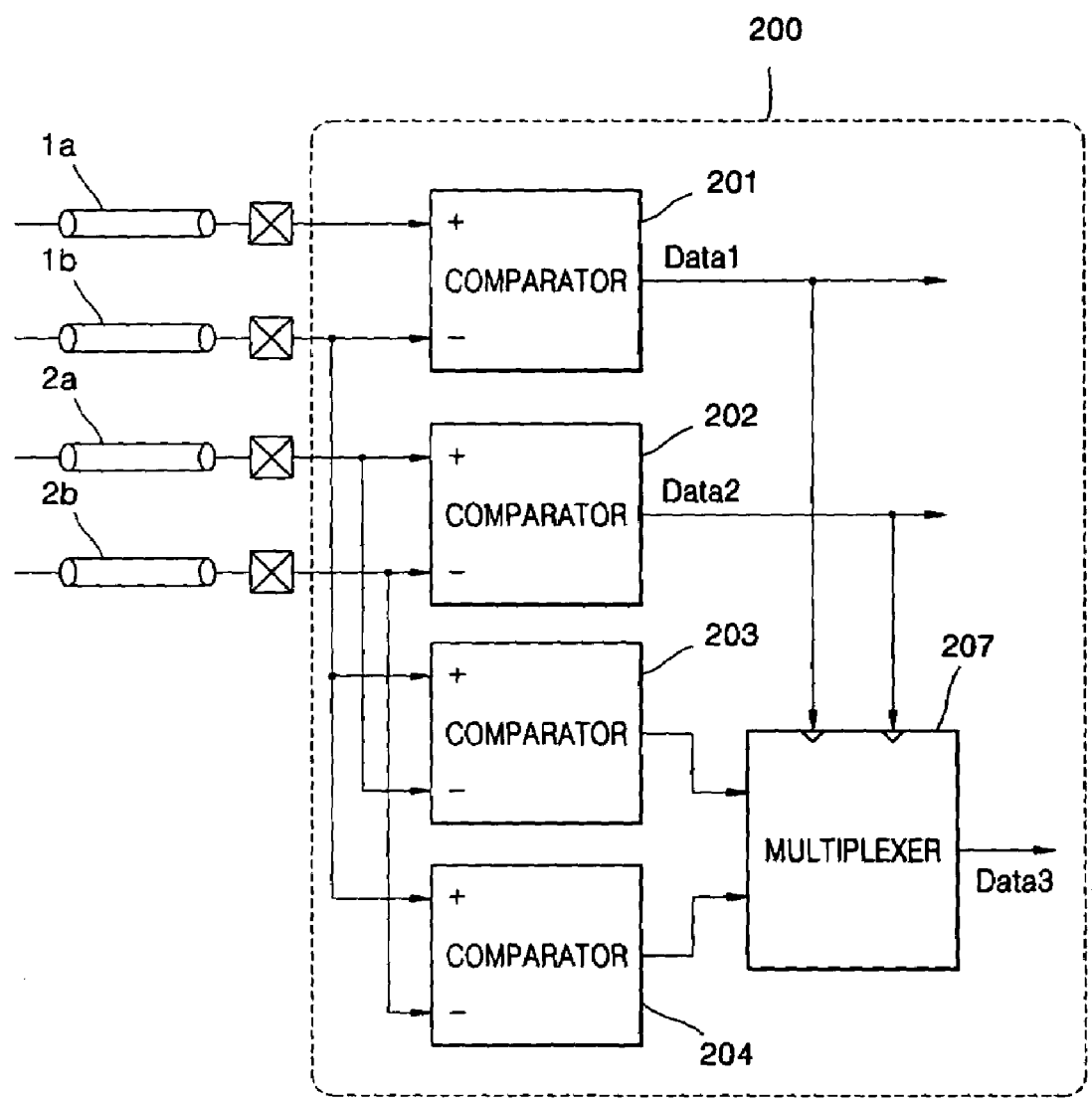
FIG. 4A is a block diagram of a receiving circuit according to a first embodiment of the present invention.
Figure 4B:
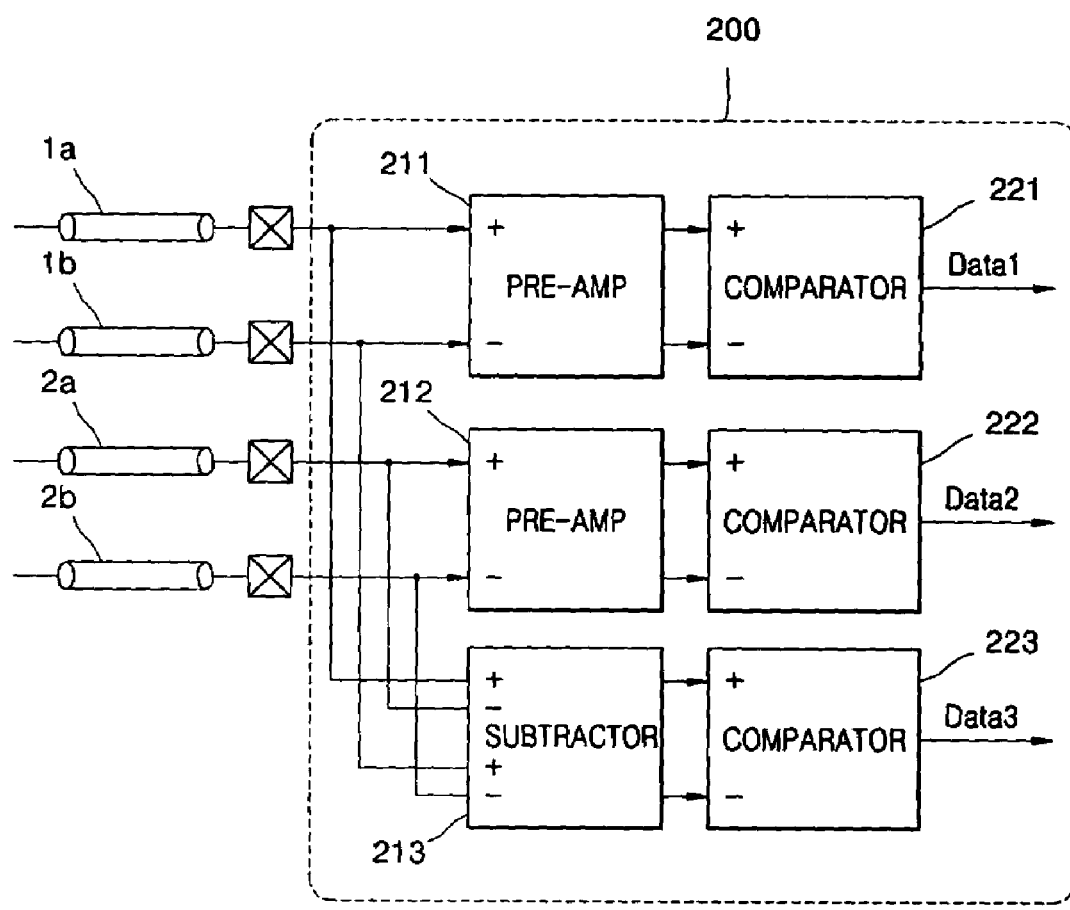
FIG. 4B is a block diagram of a receiving circuit according to a second embodiment of the present invention.
Figure 4C:
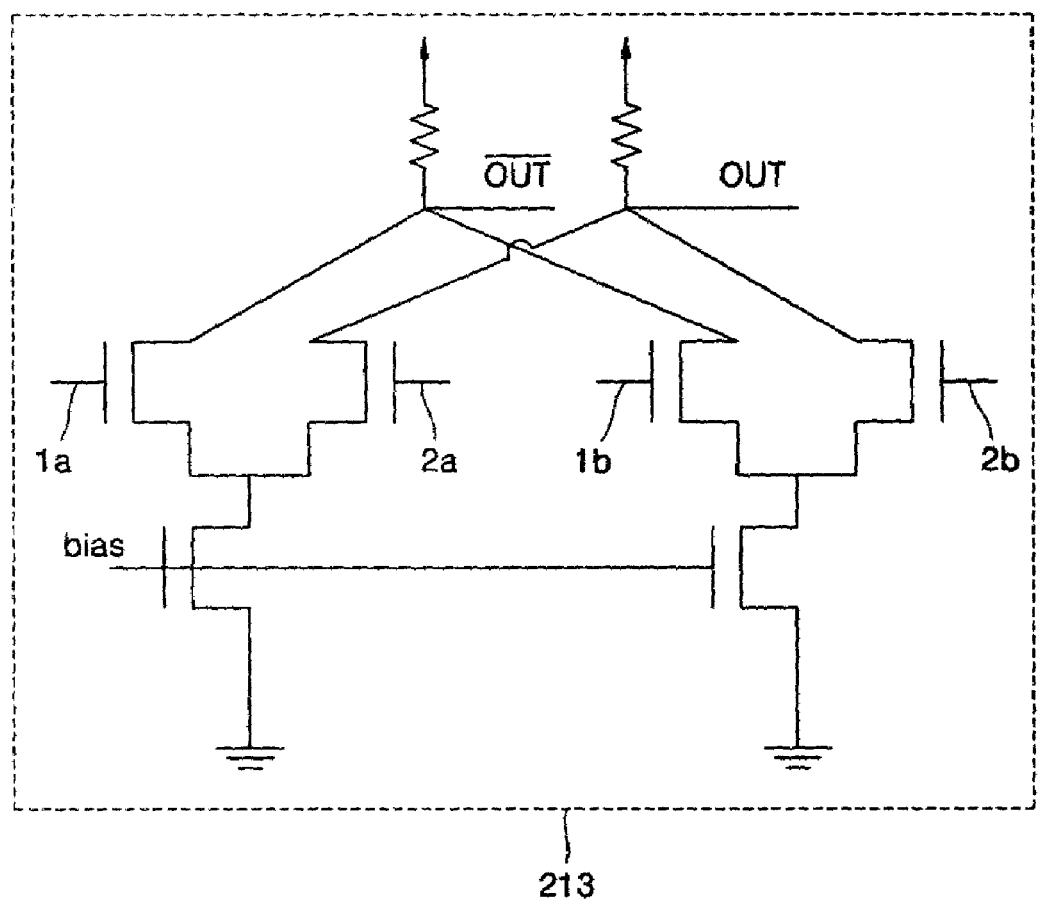
FIG. 4C is a circuit diagram of a subtraction circuit included in a receiving circuit according to an embodiment of the present invention.
Figure 5A:
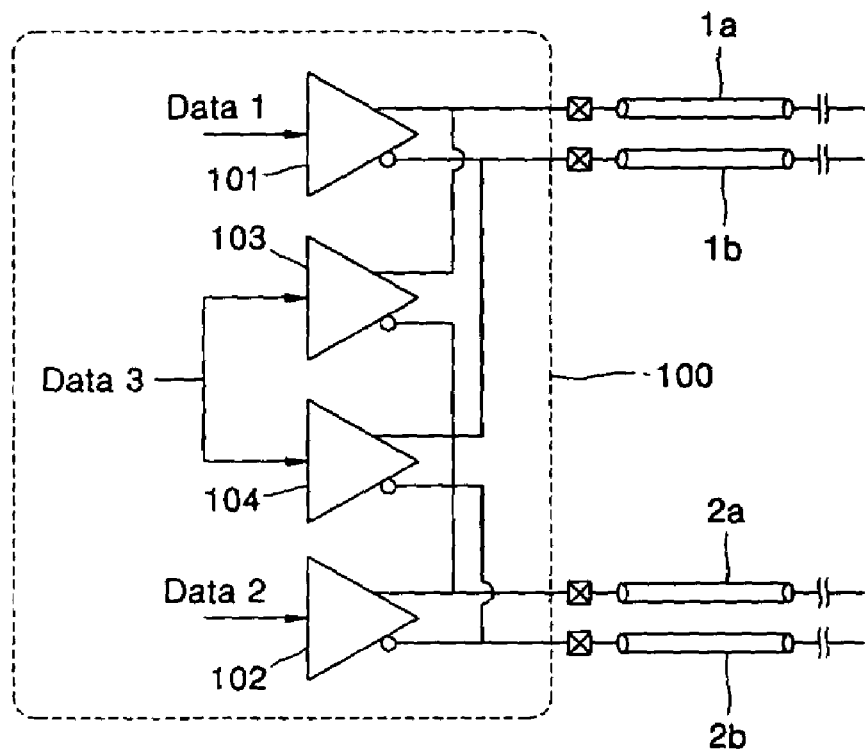
FIGS. 5A and 5B are circuit diagrams of a transmitter for differentially transmitting three units of data via four signal lines according to an embodiment of the present invention.
Figure 5B:
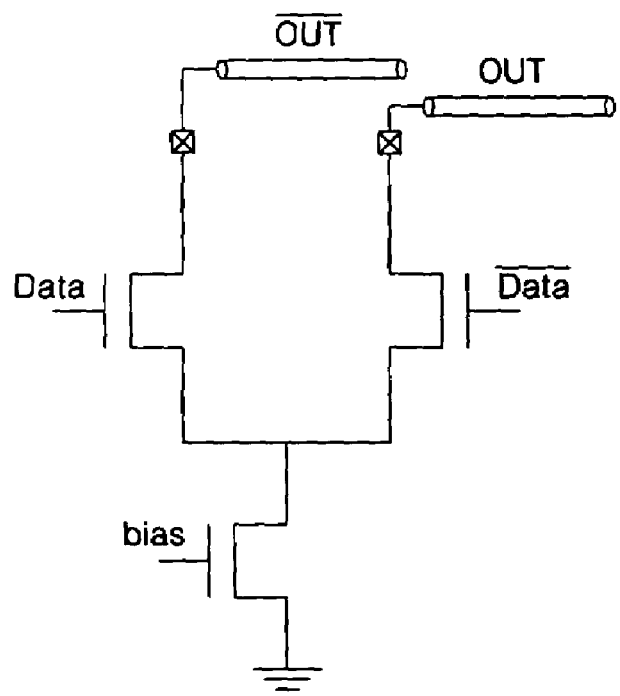
Figure 6A:
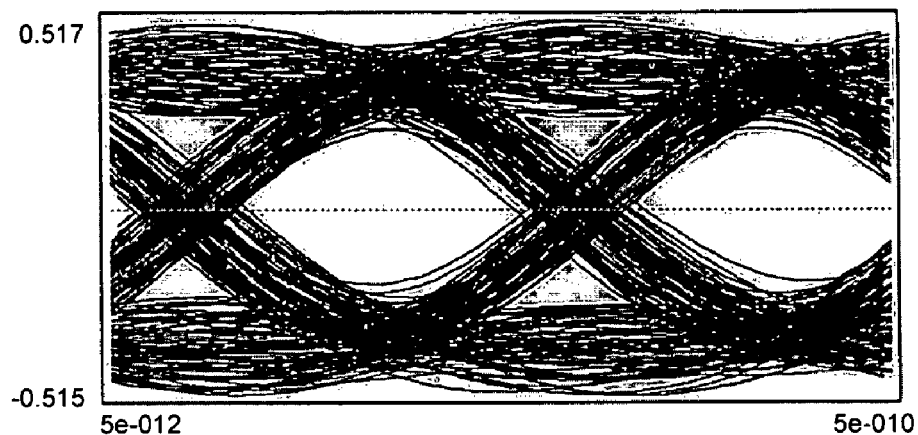
FIGS. 6A through 6C are eye diagrams of a signal conducted according to an embodiment of the present invention.
Figure 6B:
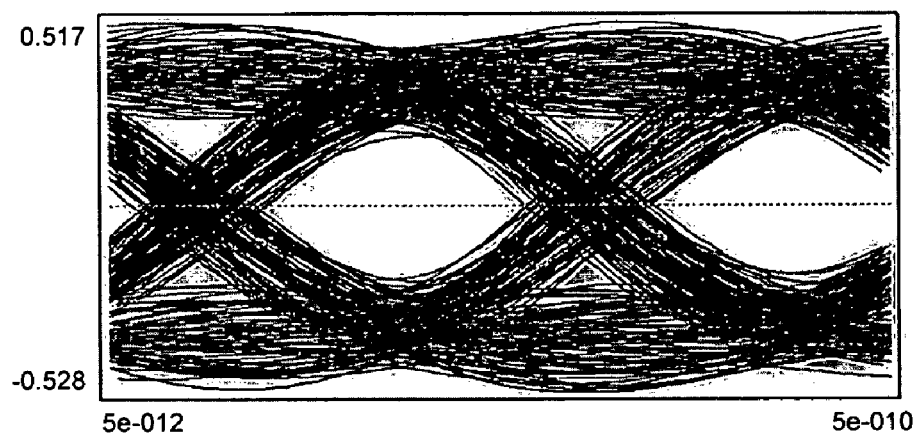
Figure 6C:
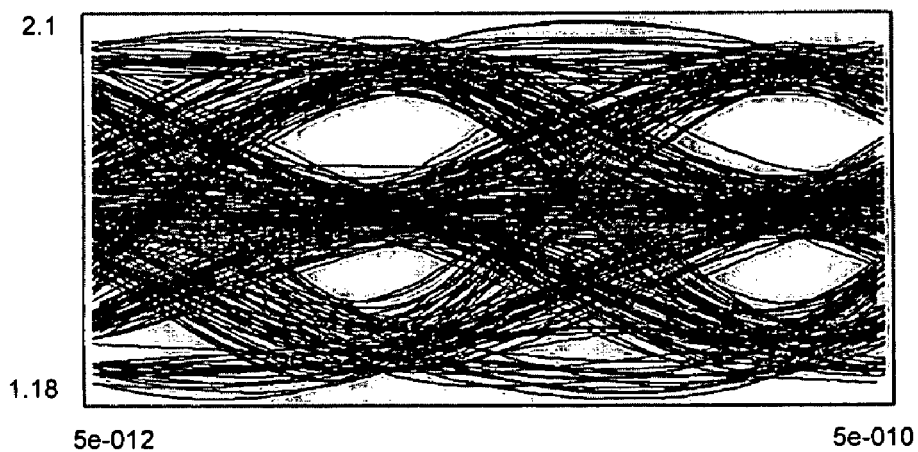
Figure 7A:
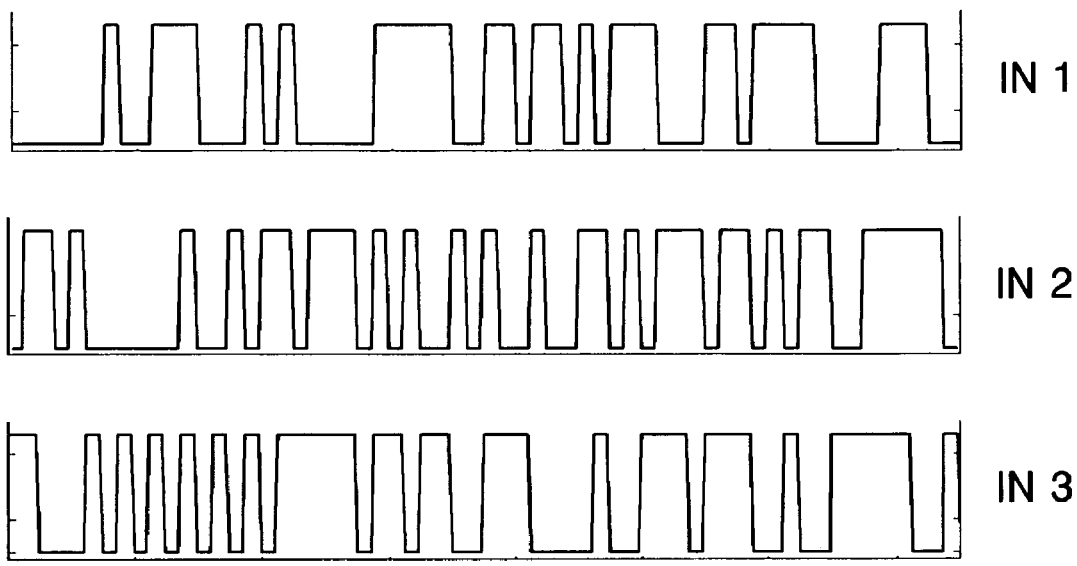
FIGS. 7A and 7B are graphs of experimental data obtained by restoring three units of data transmitted according to an embodiment of the present invention.
Figure 7B:
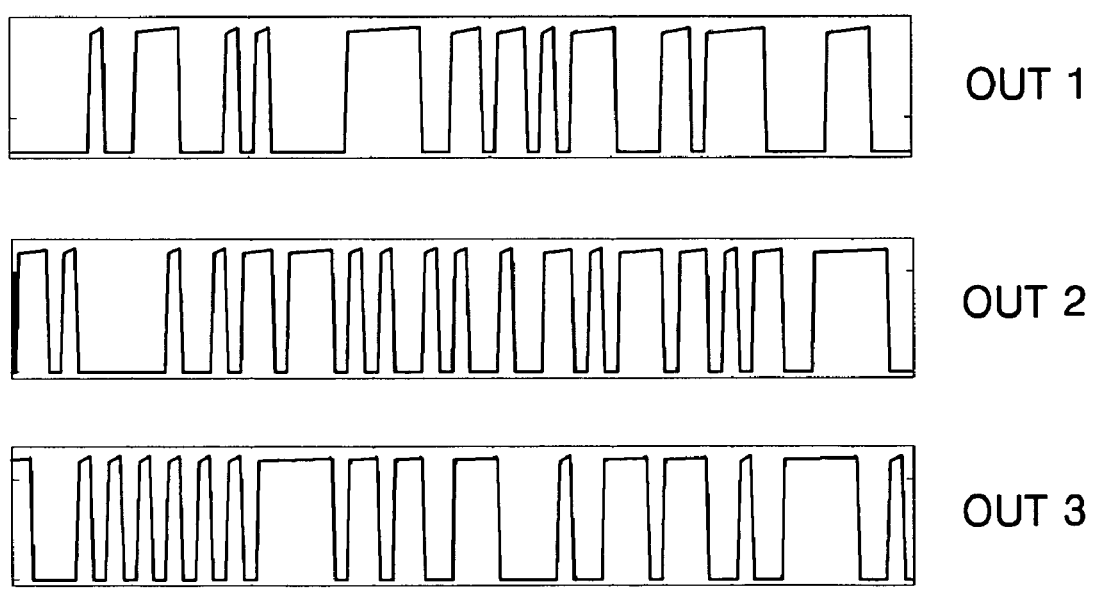

FIG. 1 is a schematic configuration diagram of a current mode differential transmission system for transmitting three units of data using four signal lines according to an embodiment of the present invention. FIG. 2A is a conceptual diagram of a current mode differential transmission method for transmitting three units of data using four signal lines when third data is '0' according to an embodiment of the present invention. FIG. 2B is a conceptual diagram of a current mode differential transmission method for transmitting three units of data using four signal lines when third data is '1' according to an embodiment of the present invention. FIG. 3A illustrates a differential current signal conducted to four signal lines depending on three units of data when third data is '1' according to an embodiment of the present invention. FIG. 3B illustrates a differential current signal conducted to four signal lines depending on three units of data when third data is '0' according to an embodiment of the present invention. FIG. 4A is a block diagram of a receiving circuit according to a first embodiment of the present invention. FIG. 4B is a block diagram of a receiving circuit according to a second embodiment of the present invention. FIG. 4C is a circuit diagram of a subtraction circuit included in a receiving circuit according to an embodiment of the present invention. FIGS. 5A and 5B are circuit diagrams of a transmitter for differentially transmitting three units of data via four signal lines according to an embodiment of the present invention. FIGS. 6A through 6C are eye diagrams of a signal conducted according to an embodiment of the present invention. FIGS. 7A and 7B are graphs of experimental data obtained by restoring three units of data transmitted according to an embodiment of the present invention.

Referring to FIG. 1, the current mode differential transmission system includes four signal lines 1a, 1b, 2a, and 2b divided into two pairs of signal lines 1a/1b and 2a/2b, a transmitter 100, which differentially transmits respective data, i.e., first data Data1 and second data Data2, to the two pairs of signal lines 1a/1b and 2a/2b and transmits the other data, i.e., third data Data3, by differentially changing common mode currents of the two pairs of signal lines 1a/1b and 2a/2b, and a receiver 200, which restores the first data Data1 and the second data Data2 using a differential circuit and restores the third data Data3 by discriminating a difference between the common mode currents of the two pairs of signal lines 1a/1b and 2a/2b.

Referring to FIG. 4A, as the first embodiment, the receiver 200 includes a first comparator 201 for restoring differential data of the first pair of signal lines 1a and 1b, a second comparator 202 for restoring differential data of the second pair of signal lines 2a and 2b, a third comparator 203 for comparing a voltage of the line 1b of the first pair of signal lines 1a and 1b and a voltage of the line 2a of the second pair of signal lines 2a and 2b, a fourth comparator for comparing the voltage of the line 1b of the first pair of signal lines 1a and 1b and a voltage of the line 2b of the second pair of signal lines 2a and 2b, and a multiplexer 207 for obtaining restored third data Data3 by selecting one of the comparison results of the third comparator 203 and the fourth comparator 204 with reference to the first data Data1 and the second data Data2 respectively restored by the first comparator 201 and the second comparator 202.

Referring to FIG. 4B, as the second embodiment, the receiver 200 includes a first pre-amp 211 and a first comparator 221 for restoring differential data of the first pair of signal lines 1a and 1b, a second pre-amp 212 and a second comparator 222 for restoring differential data of the second pair of signal lines 2a and 2b, and a subtractor 213 and a third comparator for discriminating the third data Data3 by directly comparing the common mode currents of the first pair of signal lines 1a and 1b and the second pair of signal lines 2a and 2b. Referring to FIG. 4C, it is preferable that the subtractor 213 includes a plurality of CMOSs and a plurality of resistors.

Referring to FIG. 5A, the transmitter 100 includes a plurality of (preferably four) operational amplifiers (OP-Amps). Referring to FIG. 5B, an output driving circuit of the transmitter 100 includes a plurality of CMOSs.

A current mode differential transmission method realized by the current mode differential transmission system for transmitting three units of data using four signal lines will now be described with reference to FIGS. 1 through 7.

The current mode differential transmission method and system for transmitting three units of data using four signal lines can dramatically reduce the number of signal lines compared with a conventional differential transmission method while maintaining advantages of the conventional differential transmission method. That is, three units of data Data1, Data2 and Data3 are differentially transmitted via four signal lines 1a, 1b, 2a and 2b using a current mode. The two units of data Data1 and Data2 are transmitted via the four signal lines 1a, 1b, 2a and 2b using the conventional differential transmission method. That is, the four signal lines 1a, 1b, 2a and 2b are divided into two pairs of signal lines 1a/1b and 2a/2b, and the respective units of data Data1 and Data2 are transmitted via the two pairs of signal lines 1a/1b and 2a/2b using the differential method. The other data Data3 is transmitted by differentially changing common mode currents of the two pairs of signal lines 1a/1b and 2a/2b. The transmitted three units of data Data1, Data2 and Data3 are restored in the receiver 200 using a differential circuit.

As described above, in the current mode differential transmission method, a reference voltage is not necessary since signals of the two signal lines are used as reference values to each other, and switching noise is reduced since a constant amount of current flows through a ground pin. Therefore, since the number of chip pins and the number of signal lines are reduced to ⅔ of a total required number while maintaining advantages of the conventional differential transmission method, a unit price of chip decreases, and distribution of signal lines is simple.

FIGS. 2A and 2B illustrate a method of transmitting three units of data using four signal lines. The two units of data Data1 and Data2 of the three units of data Data1, Data2 and Data3 are differentially transmitted using the corresponding pairs of signal lines 1a/1b and 2a/2b. At the same time, the other data Data3 is transmitted by differentially changing a difference between common mode currents of the two pairs of signal lines 1a/1b and 2a/2b. In other words, signal changing ranges of the two pairs of signal lines 1a/1b and 2a/2b are changed depending on the third data Data3. That is, when the third data Data3 is 1, the first pair of differential signal lines 1a and 1b have a changing range of 0~I, and the second pair of differential signal lines 2a and 2b have a changing range of −I~0, as shown in FIG. 2B. Also, when the third data Data3 is 0, the first pair of differential signal lines 1a and 1b have a changing range of −I~0, and the second pair of differential signal lines 2a and 2b have a changing range of 0~I, as shown in FIG. 2A. The receiver 200 restores the third differential signal by discriminating the difference between the common mode currents of the two pairs of signal lines 1a/1b and 2a/2b.

FIGS. 3A and 3B show current values conducted to respective signal lines 1a, 1b, 2a and 2b when three units of data are transmitted using four signal lines.

The receiver 200 can be realized in two methods as shown in FIGS. 4A and 4B.

According to the configuration shown in FIG. 4A, a look-ahead method is used. The first and second data Data1 and Data2 are restored by the first and second comparators 201 and 202. At this time, as shown in FIGS. 3A and 3B, the third data Data3 is a difference between a current of the signal line 1b and a current of the signal line 2b when the two units of data Data1 and Data2 conducted to the two pairs of signal lines 1a/1b and 2a/2b are 00 or 11, and the third data Data3 is a difference between the current of the signal line 1b and a current of the signal line 2a when the two units of data Data1 and Data2 conducted to the two pairs of signal lines 1a/1b and 2a/2b are 01 or 10.

Four comparators are used in FIG. 4A. The first comparator 201 and the second comparator 202 restore the first data Data1 and the second data Data2 by directly restoring differential signals of the first pair of signal lines 1a and 1b and the second pair of signal lines 2a and 2b, respectively. Also, the third comparator 203 compares a voltage of the signal line 1b and a voltage of the signal 2a, and the fourth comparator 204 compares the voltage of the signal line 1b and a voltage of the signal 2b. At this time, one of the two comparison results restored by the third comparator 203 and the fourth comparator 204 is selected as the third data Data3 by the multiplexer 207 using the first data Data1 and the second data Data2 restored by the first comparator 201 and the second comparator 202. That is, the receiver 200 shown in FIG. 4A selects one of discriminated signals using the other units of data in order to restore the third data Data3 transmitted as a difference between common mode currents.

The receiver 200 shown in FIG. 4B restores the third data Data3 by directly comparing common mode currents of the first pair of signal lines 1a and 1b and the second pair of signal lines 2a and 2b. That is, the receiver 200 shown in FIG. 4B restores the third data Data3 by amplifying only differences between the common mode currents of the first pair of signal lines 1a and 1b and the second pair of signal lines 2a and 2b using the subtractor 213 and comparing the differences in the third comparator 223. At this time, the first data Data1 and the second data Data2 are restored using conventional pre-amps 211 and 212 and comparators 221 and 222.

An example of the common mode subtractor 213 composed of a plurality of CMOSs is shown in FIG. 4C. An output voltage V(OUT) of the common mode subtractor 213 is represented as follows.

$$V(\text{OUT}) = \frac{1}{2} g_m R \times [(V(1a) + V(1b)) - (V(2a) + V(2b))]$$

As shown in the above equation, the common mode subtractor 213 generates signals OUT,$\overline{\text{OUT}}$ by amplifying a difference between a sum (a common mode voltage) of voltages of the first pair of signal lines 1a and 1b and a sum (a common mode voltage) of voltages of the second pair of signal lines 2a and 2b. At this time, since the voltages of the two pairs of signal lines 1a/1b and 2a/2b are proportional to currents of the two pairs of signal lines 1a/1b and 2a/2b, the common mode subtractor 213 shown in FIG. 4C restores a difference between the common mode currents of the two pairs of signal lines 1a/1b and 2a/2b. The third data Data3 is restored by inputting the OUT signal and the $\overline{\text{OUT}}$ signal to the third comparator 223.

The transmitter 100 is shown in FIGS. 5A and 5B. In FIG. 5A, the first data Data1 and the second data Data2 are transmitted via the two pairs of signal lines 1a/1b and 2a/2b by being current-differentiated by OP-Amps 101 and 102, respectively. At the same time, the third data Data3 is transmitted by differentially adding or subtracting the first data Data1 and the second data Data2 using OP-Amps 103 and 104, i.e., by changing the common mode currents of the two pairs of signal lines 1a/1b and 2a/2b. These are represented as follows.

$$I(1a)=A \cdot (\text{Data1}+\text{Data3})$$

$$I(1b)=A \cdot (-\text{Data1}+\text{Data3})$$

$$I(2a)=A \cdot (\text{Data2}-\text{Data3})$$

$$I(2b)=A \cdot (-\text{Data2}-\text{Data3})$$

In the above equation, A is a constant number. Accordingly, the equation can be represented as follows.

$$\text{Data1}=I(1a)-I(1b)$$

$$\text{Data2}=I(2a)-I(2b)$$

$$\text{Data3}=0.5[(I(1a)-I(1b))-(I(2a)+I(2b))]$$

The first data Data1 is transmitted using a differential signal of the first pair of signal lines 1a and 1b, the second data Data2 is transmitted using a differential signal of the second pair of signal lines 2a and 2b, and the third data Data3 is transmitted using differences of common mode currents of the two pairs of signal lines 1a/1b and 2a/2b. Therefore, the transmitted data can be restored by the receiver 200 shown in FIG. 4A or FIGS. 4B and 4C as described above.

An example of a differential output driving circuit used for the transmitter 100 is shown in FIG. 5B. Referring to FIGS. 5A and 5B, the total amount of current consumption is 4I since four driving circuits are used to transmit three units of data. In the conventional differential transmission method having the same voltage margin as the current mode differential transmission method, the total amount of current consumption is 3I since three driving circuits are used to transmit three units of data. Therefore, the amount of power consumption in the current mode differential transmission method increases to four-third of the amount of power consumption in the conventional differential transmission method. Also, since the number of pins and the number of signal lines in the current mode differential transmission method are reduced to two-third of the number of pins and the number of signal lines in the conventional differential transmission method, a trade-off relationship exists between the number of pins and the power consumption of the output driving circuit of the transmitter 100. At this time, the amount of current flowing through a ground pin is constantly 4I, and small switching noise is maintained.

FIG. 6 shows eye diagrams of simulation results in the current mode differential transmission system. FIG. 6A is an eye diagram of a differential signal of the first pair of signal lines 1a and 1b. FIG. 6B is an eye diagram corresponding to a difference between common mode voltages of the first pair of signal lines 1a and 1b and the second pair of signal lines 2a and 2b. Since the same output driving circuit is used for the differential mode transmission and the differential transmission of the common mode voltages, the eye diagrams of FIGS. 6A and 6B have almost same aspects. In the simulation, it is assumed that a signal transfer rate is 4 Gbps and a load capacitance is 2 pF. An eye diagram of a conventional single-ended method is shown in FIG. 6C. The eye diagram of the conventional single-ended method is distorted due to common mode noise and reflecting waves so that data is hardly restored. However, if the data is differentially restored in the receiver, the eye diagram is clean. Accordingly, a voltage margin and a time margin increase when restoring the data.

FIG. 7 shows result graphs restored in the receiver 200 when three units of data are input to the current mode differential transmission system according to an embodiment of the present invention. Referring to FIG. 7, all of the input data is normally transmitted.

As described above, according to the embodiment of the present invention, three units of data can be transmitted using four signal lines.

Though the method of transmitting three units of data using four signal lines are described above, it will be understood by those skilled in the art that a multiple of three units of data can be transmitted using a multiple of four signal lines in an embodiment of the present invention.

As described above, a current mode differential transmission method and system for differentially transmitting three units of data using four signal lines according to an embodiment of the present invention reduce the number of pins and the number of signal lines compared with a conventional differential transmission method and have advantages of the conventional differential transmission method in which common mode noise is removed and a reference voltage is not necessary.

While this invention has been particularly shown and described with reference to preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A current mode differential transmission method for differentially transmitting three units of data using four signal lines, in which predetermined data is differentially transmitted to signal lines, the method comprising:

dividing the four signal lines 1 a, 1 b, 2a and 2b into two pairs of signal lines 1a/1b and 2a/2b, and differentially transmitting respective data (first data and second data) via the two pairs of signal lines 1a/1b and 2a/2b; and transmitting the other data (third data) by differentially changing common mode currents of the two pairs of signal lines 1a/1b and 2a/2b, wherein, when the third data is 1, the pair of signal lines 1a and 1b of the first data have a changing range of 0~I where I is a predetermined amount of current, and the pair of signal lines 2a and 2b of the second data have a changing range of –I~0, and when the third data is 0, the pair of signal lines 1a and 1b of the first data have a changing range of –I~0, and the pair of signal lines 2a and 2b of the second data have a changing range of 0~I.

2. The method of claim 1, wherein signal changing ranges of the two pairs of signal lines 1a/1b and 2a/2b vary according to the third data.

3. The method of claim 1, further comprising:

restoring differential data of the first pair of signal lines 1a and 1b in a first comparator of a receiver and restoring differential data of the second pair of signal lines 2a and 2b in a second comparator of the receiver;

comparing a voltage of the line 1*b* of the first pair of signal lines 1*a* and 1*b* and a voltage of the line 2*a* of the second pair of signal lines 2*a* and 2*b* in a third comparator and comparing the voltage of the line 1*b* of the first pair of signal lines 1*a* and 1*b* and a voltage of the line 2*b* of the second pair of signal lines 2*a* and 2*b* in a fourth comparator; and obtaining restored third data by selecting one of the comparison results of the third comparator and the fourth comparator with reference to the first data and the second data respectively restored by the first comparator and the second comparator.

4. The method of claim 3, wherein the obtaining of the restored third data by selecting one of the comparison results of the third comparator and the fourth comparator with reference to the restored first and second data is performed by a multiplexer.

5. The method of claim 1, further comprising:
restoring differential data of the first pair of signal lines 1*a* and 1*b* in a first comparator of a receiver and restoring differential data of the second pair of signal lines 2*a* and 2*b* in a second comparator of the receiver; and
discriminating the third data by directly comparing common mode currents of the first pair of signal lines 1*a* and 1*b* and the second pair of signal lines 2*a* and 2*b*.

6. The method of claim 5, wherein pre-amps are interposed in front of the first comparator and the second comparator, and the discriminating of the third data by directly comparing the common mode currents is performed by a subtractor and a third comparator.

7. A current mode differential transmission system for differentially transmitting three units of data using four signal lines, which differentially transmits predetermined data to signal lines, the system comprising:
four signal lines 1*a*, 1*b*, 2*a* and 2*b* divided into two pairs of signal lines 1*a*/1*b* and 2*a*/2*b*;
a transmitter differentially transmitting respective data (first data and second data) via the two pairs of signal lines 1*a*/1*b* and 2*a*/2*b* and transmitting the other data (third data) by differentially changing common mode currents of the two pairs of signal lines 1*a*/1*b* and 2*a*/2*b*; and a receiver restoring the first data and the second data using a differential circuit and restoring the third data by discriminating a difference between the common mode currents of the two pairs of signal lines 1*a*/1*b* and 2*a*/2*b*, wherein, when the third data is 1, the pair of signal lines 1*a* and 1*b* of the first data have a changing range of 0~I where I is a predetermined amount of current, and the pair of signal lines 2*a* and 2*b* of the second data have a changing range of −I~0, and when the third data is 0, the pair of signal lines 1*a* and 1*b* of the first data have a changing range of −I~0, and the pair of signal lines 2*a* and 2*b* of the second data have a changing range of 0~I.

8. The system of claim 7, wherein signal changing ranges of the two pairs of signal lines 1*a*/1*b* and 2*a*/2*b* vary according to the third data.

9. The system of claim 7, wherein the receiver comprises:
a first comparator restoring differential data of the first pair of signal lines 1*a* and 1*b*;
a second comparator restoring differential data of the second pair of signal lines 2*a* and 2*b*;
a third comparator comparing a voltage of the line 1*b* of the first pair of signal lines 1*a* and 1*b* and a voltage of the line 2*a* of the second pair of signal lines 2*a* and 2*b*;
a fourth comparator comparing the voltage of the line 1*b* of the first pair of signal lines 1*a* and 1*b* and a voltage of the line 2*b* of the second pair of signal lines 2*a* and 2*b*; and
a multiplexer obtaining restored third data by selecting one of the comparison results of the third comparator and the fourth comparator with reference to the first data and the second data respectively restored by the first comparator and the second comparator.

10. The system of claim 7, wherein the receiver comprises:
a first pre-amp and a first comparator restoring differential data of the first pair of signal lines 1*a* and 1*b*;
a second pre-amp and a second comparator restoring differential data of the second pair of signal lines 2*a* and 2*b*; and
a subtractor and a third comparator discriminating the third data by directly comparing common mode currents of the first pair of signal lines 1*a* and 1*b* and the second pair of signal lines 2*a* and 2*b*.

\* \* \* \* \*